US008961322B2

(12) United States Patent
Nelson et al.

(10) Patent No.: US 8,961,322 B2
(45) Date of Patent: Feb. 24, 2015

(54) GAME REMOVAL WITH GAME HISTORY

(71) Applicant: IGT, Las Vegas, NV (US)

(72) Inventors: Dwayne R. Nelson, Reno, NV (US); Steven G. LeMay, Reno, NV (US); Robert E. Breckner, Reno, NV (US); Warner R. Cockerille, Sparks, NV (US); Jamal Benbrahim, Reno, NV (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/047,847

(22) Filed: Oct. 7, 2013

(65) Prior Publication Data

US 2014/0038727 A1 Feb. 6, 2014

Related U.S. Application Data

(63) Continuation of application No. 11/367,497, filed on Mar. 3, 2006, now Pat. No. 8,550,922.

(51) Int. Cl.

| | |
|---|---|
| ***A63F 13/497*** | (2014.01) |
| ***A63F 13/30*** | (2014.01) |
| ***G07F 17/32*** | (2006.01) |

(52) U.S. Cl.

CPC ............ *A63F 13/12* (2013.01); *G07F 17/3234* (2013.01)

USPC ............................................ 463/43; 463/24

(58) Field of Classification Search

CPC . G07F 17/32; G07F 17/3225; G07F 17/3234; G07F 17/3237; G07F 17/3241

USPC ............................................ 463/24, 29, 43

See application file for complete search history.

(56) References Cited

U.S. PATENT DOCUMENTS

| | | | |
|---|---|---|---|
| 3,931,504 | A | 1/1976 | Jacoby |
| 4,430,728 | A | 2/1984 | Beitel et al. |

(Continued)

FOREIGN PATENT DOCUMENTS

| | | |
|---|---|---|
| EP | 1 046 996 | 10/2000 |
| EP | 1 255 234 | 6/2002 |

(Continued)

OTHER PUBLICATIONS

Australia Examiner's First Report dated Mar. 21, 2011 issued in 2007224274.

(Continued)

*Primary Examiner* — Damon Pierce
*Assistant Examiner* — Allen Chan
(74) *Attorney, Agent, or Firm* — Neal, Gerber & Eisenberg LLP

(57) ABSTRACT

Systems and methods for replaying a prior game play cycle of a game on a gaming terminal, wherein the game has been deactivated from the gaming terminal, are disclosed. The method includes deactivating the game from the gaming terminal, wherein the game includes a game logic component and an accumulative data component, the accumulative data component including minimal state information required to recreate a prior game play cycle of the game on the gaming terminal. Deactivating the game includes removing the game logic component from the gaming terminal and preserving the accumulative data component of the game. The method further includes receiving an indication that the prior game play cycle is to be recreated, downloading the game logic component to the gaming terminal, and recreating the prior game play cycle on the gaming terminal with the game logic component and the accumulative data component.

25 Claims, 4 Drawing Sheets

(56) References Cited

U.S. PATENT DOCUMENTS

| | | | |
|---|---|---|---|
| 4,454,594 | A | 6/1984 | Heffron et al. |
| 4,607,844 | A | 8/1986 | Fullerton |
| 4,948,138 | A | 8/1990 | Pease et al. |
| 5,274,827 | A | 12/1993 | Haggerty et al. |
| 5,344,144 | A | 9/1994 | Canon |
| 5,551,020 | A | 8/1996 | Flax et al. |
| 5,625,819 | A | 4/1997 | Hoffer, Jr. |
| 5,643,086 | A | 7/1997 | Alcorn et al. |
| 5,680,570 | A | 10/1997 | Rantala et al. |
| 5,761,647 | A | 6/1998 | Boushy |
| 5,851,149 | A | 12/1998 | Xidos et al. |
| 5,968,153 | A | 10/1999 | Wheeler et al. |
| 5,971,851 | A | 10/1999 | Pascal et al. |
| 5,978,808 | A | 11/1999 | Wells et al. |
| 6,065,148 | A | 5/2000 | Obermeier et al. |
| 6,070,202 | A | 5/2000 | Minkoff et al. |
| 6,071,190 | A | 6/2000 | Weiss et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,149,522 | A | 11/2000 | Alcorn et al. |
| 6,183,366 | B1 | 2/2001 | Goldberg et al. |
| 6,205,548 | B1 | 3/2001 | Hasbun |
| 6,253,374 | B1 | 6/2001 | Dresevic et al. |
| 6,264,561 | B1 | 7/2001 | Saffari et al. |
| 6,286,088 | B1 | 9/2001 | Campbell et al. |
| 6,293,865 | B1 | 9/2001 | Kelly et al. |
| 6,394,907 | B1 | 5/2002 | Rowe |
| 6,408,368 | B1 | 6/2002 | Parady |
| 6,412,053 | B2 | 6/2002 | Bonola |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,467,038 | B1 | 10/2002 | Piwonka et al. |
| 6,471,591 | B1 | 10/2002 | Crumby |
| 6,488,580 | B1 | 12/2002 | Robb |
| 6,503,147 | B1 | 1/2003 | Stockdale et al. |
| 6,589,119 | B1 | 7/2003 | Orus et al. |
| 6,609,187 | B1 | 8/2003 | Merrell et al. |
| 6,685,559 | B2 | 2/2004 | Luciano et al. |
| 6,685,567 | B2 | 2/2004 | Cockerille et al. |
| 6,704,851 | B2 | 3/2004 | Siebert |
| 6,804,763 | B1 | 10/2004 | Stockdale et al. |
| 6,816,956 | B1 | 11/2004 | Benayon et al. |
| 6,839,823 | B1 | 1/2005 | See et al. |
| 6,863,608 | B1 | 3/2005 | LeMay et al. |
| 6,866,586 | B2 | 3/2005 | Oberberger et al. |
| 6,874,075 | B2 | 3/2005 | Jerding et al. |
| 6,918,831 | B2 * | 7/2005 | Nguyen et al. .................. 463/20 |
| 6,962,530 | B2 | 11/2005 | Jackson |
| 7,111,141 | B2 | 9/2006 | Nelson |
| 7,116,782 | B2 | 10/2006 | Jackson et al. |
| 7,374,487 | B2 | 5/2008 | Nelson |
| 7,390,262 | B2 | 6/2008 | Nelson |
| 7,412,559 | B2 | 8/2008 | Stockdale et al. |
| 7,904,687 | B2 | 3/2011 | Nelson |
| 2002/0016896 | A1 | 2/2002 | Siebert |
| 2002/0026566 | A1 | 2/2002 | Awada et al. |
| 2002/0049909 | A1 | 4/2002 | Jackson et al. |
| 2003/0073497 | A1 | 4/2003 | Nelson |
| 2003/0203756 | A1 | 10/2003 | Jackson |
| 2004/0002379 | A1 | 1/2004 | Parrott et al. |
| 2004/0147314 | A1 | 7/2004 | LeMay et al. |
| 2005/0010738 | A1 | 1/2005 | Stockdale et al. |
| 2005/0164795 | A1 | 7/2005 | Whitten et al. |
| 2005/0192092 | A1 * | 9/2005 | Breckner et al. ................ 463/31 |
| 2005/0192099 | A1 | 9/2005 | Nguyen et al. |
| 2005/0216687 | A1 | 9/2005 | Fu |
| 2006/0079333 | A1 * | 4/2006 | Morrow et al. ................. 463/43 |
| 2007/0017458 | A1 | 1/2007 | Frodl et al. |
| 2007/0207852 | A1 | 9/2007 | Nelson et al. |
| 2007/0207854 | A1 | 9/2007 | Wolf et al. |
| 2007/0266220 | A1 | 11/2007 | Nelson |

FOREIGN PATENT DOCUMENTS

| | | |
|---|---|---|
| GB | 2 308 171 | 6/1997 |
| JP | 58-213281 | 12/1983 |
| WO | WO-00/05652 | 2/2002 |
| WO | WO-2004/025655 | 3/2004 |
| WO | WO-2007/103069 | 9/2007 |
| WO | WO-2007/103170 | 9/2007 |

OTHER PUBLICATIONS

Australian Office Action dated Dec. 10, 2008 from related Australian Application No. 2003270623.
Australian Office Action dated Dec. 24, 2009 issued in Application No. 2003270623.
Australian Office Action dated Jan. 16, 2008 from related Australian Application No. 2006249229.
Australian Office Action dated May 15, 2009 issued in Application No. 2006249229.
Canadian Office Action dated Aug. 7, 2009 issued in Application No. 2,358,378.
Canadian Office Action dated Feb. 16, 2011 issued in Application No. 2,358,378.
Canadian Office Action dated Nov. 25, 2010 issued in Application No. 2,498,667.
Canadian Office Action dated Oct. 6, 2009 issued in Application No. 2,498,667.
Australian Office Action dated Sep. 30, 2005 from a Corresponding AU Application No. 79469/01 (4 pages).
Dallas Semiconductor, "DS123: Flexible Non-volatile Controller with Lithium Battery Monitor," www.dalsemi.com, Nov. 1999.
European Office Action dated Dec. 12, 2008 from corresponding EP Application No. 07751864.5.
European Search Report dated Feb. 14, 2007 from corresponding EP Application No. 03752329.7.
European Search Report dated Nov. 20, 2006 from corresponding EP Application No. 03752329.7.
Intel Corporation, "Flash Memory PCI Add-in Card for Embedded Systems", Application Note: AP-758, Sep. 1997.
International Preliminary Report on Patentability and Written Opinion dated on Sep. 9, 2008, issued in Application No. PCT/US2007/005132.
International Preliminary Report on Patentability and Written Opinion dated on Sep. 9, 2008, issued in Application No. PCT/US2007/005337.
International Search Report dated Nov. 19, 2004 issued in PCT/US2003/028748.
Levinthal, Adam and Barnett, Michael, "The Silicon Gaming Odyssey Slot Machine," Feb. 1997, COMPCON '97 Proceedings, IEEE San Jose, CA; IEEE Comput. Soc., pp. 296-301.
Martinek et al., "Computerized Gaming System, Method and Apparatus", U.S. Appl. No. 09/520,405, filed Mar. 8, 2000 (28 pages).
Notice of Allowance and Examiner Amendment dated Oct. 29, 2010 issued in U.S. Appl. No. 11/879,463.
Notice of Allowance and Examiner Amendment dated Oct. 7, 2010 issued in U.S. Appl. No. 11/367,525.
Notice of Allowance dated Aug. 1, 2007 and Allowed Claims from corresponding U.S. Appl. No. 11/517,743 (4 pages).
Notice of Allowance dated Aug. 24, 2007 and Allowed Claims from corresponding U.S. Appl. No. 11/729,407 (4 pages).
Notice of Allowance dated Dec. 19, 2007 and Allowed Claims from corresponding U.S. Appl. No. 11/729,407 (US Patent No. 7,374,487) (9 pages).
Notice of Allowance dated Jan. 5, 2007 and Allowed Claims from corresponding U.S. Appl. No. 11/517,743 (7 pages).
Notice of Allowance dated May 12, 2006 and Allowed Claims from corresponding U.S. Appl. No. 10/243,104 (6 pages).
Notice of Allowance dated May 2, 2007 and Allowed Claims from corresponding U.S. Appl. No. 11/517,743 (4 pages).
PCT International Search Report and Written Opinion in PCT/US2007/005132, mailed on Oct. 16, 2007.
PCT International Search Report and Written Opinion in PCT/US2007/005337, mailed on Jun. 12, 2007.

(56) References Cited

OTHER PUBLICATIONS

Russian Advisory Action dated Sep. 10, 2007, from related Russian Application No. 2005106847, 10 pgs.
U.S. Appl. No. 10/243,104, filed Sep. 13, 2002, Office Action mailed Jan. 17, 2006.
U.S. Appl. No. 10/912,262, filed Aug. 4, 2004, Office Action mailed Jan. 30, 2006.
U.S. Final Office Action dated Apr. 7, 2010 issued in U.S. Appl. No. 11/367,525.
U.S. Office Action dated Aug. 16, 2005 from corresponding U.S. Appl. No. 10/243,104 (11 pages).
U.S. Office Action dated Dec. 4, 2006 from corresponding U.S. Appl. No. 10/912,262(18 pages).
U.S. Office Action dated Jan. 4, 2005 from corresponding U.S. Appl. No. 10/243,104 (8 pages).
U.S. Office Action dated Jul. 16, 2007 from corresponding U.S. Appl. No. 10/912,262 (6 pages).
U.S. Office Action dated Jun. 13, 2005 from corresponding U.S. Appl. No. 10/912,262 (11 pages).
U.S. Office Action dated Jun. 5, 2007 from corresponding U.S. Appl. No. 11/729,407 (7 pages).
U.S. Office Action dated May 4, 2007 from corresponding U.S. Appl. No. 11/517,743 (6 pages).
U.S. Office Action dated Oct. 7, 2009 issued in U.S. Appl. No. 11/367,525.
US Examiner Interview Summary dated Apr. 13, 2007 issued in U.S. Appl. No. 10/912,262.
US Examiner Interview Summary dated Jul. 15, 2008 issued in U.S. Appl. No. 10/912,262.
US Interview Summary dated Dec. 17, 2009 issued in U.S. Appl. No. 11/367,525.
US Notice of Allowability and Examiner's Amendment dated Jul. 13, 2004 issued in U.S. Appl. No. 09/690,931.
US Notice of Allowance and Examiner Amendment dated Jan. 24, 2011 issued in U.S. Appl. No. 11/367,525.
US Notice of Allowance dated Apr. 15, 2008 issued in U.S. Appl. No. 10/912,262.
US Notice of Allowance dated May 26, 2004 issued in U.S. Appl. No. 09/690,931.
US Office Action dated Jan. 13, 2004 issued in U.S. Appl. No. 09/690,931.
US Office Action dated May 13, 2010 issued in U.S. Appl. No. 11/879,463.

* cited by examiner

GAME REMOVAL WITH GAME HISTORY

CROSS-REFERENCE TO RELATED PATENT APPLICATIONS

This application is a continuation of U.S. patent application Ser. No. 11/367,497, titled "GAME REMOVAL WITH GAME HISTORY," filed on Mar. 3, 2006, which is hereby incorporated by reference in its entirety and for all purposes.

This application is related to the following patent applications: U.S. patent application Ser. No. 10/243,104, filed Sep. 13, 2002, which is a continuation in part of U.S. Pat. No. 6,804,763, issued Oct. 12, 2004; U.S. patent application Ser. No. 10/758,828 filed Jan. 15, 2004, which is a continuation in part of U.S. Pat. No. 6,863,608 issued Mar. 8, 2005; U.S. patent application Ser. No. 11/078,966, filed Mar. 10, 2005, which is a continuation in part of U.S. patent application Ser. No. 10/116,424, filed Apr. 3, 2002, which is in turn a continuation in part of U.S. patent application Ser. No. 09/732,650 filed Dec. 7, 2000; U.S. patent application Ser. No. 10/757,609 filed on Jan. 14, 2004 by Nelson et al.; U.S. patent application Ser. No. 10/938,293 filed on Sep. 10, 2004 by Benbrahim et al.; and U.S. patent application Ser. No. 10/243,464, filed Sep. 13, 2002 by Nguyen and Paulsen. Each of these documents is incorporated herein by reference in its entirety and for all purposes.

BACKGROUND OF THE INVENTION

There is a need to preserve certain types of game play data from gaming machines. Such data is necessary to address disputes that players may have with a casino or other gaming establishment over whether or not a winning combination occurred, the amount of pay out due, etc. Further, casino operators sometimes need the same or related information for other reasons such as re-creating events that led to a malfunction, collecting statistical information before a power failure, logging the types of games played over the life of a particular machine, etc.

Among the types of commonly preserved data is so-called "critical data" or "critical game information," which must be maintained by casinos or other gaming machine establishments. Such data may be stored as simple text and/or graphics. In some cases, entire frames of video data may be captured for this purpose. See for example U.S. patent application Ser. No. 10/758,828 filed Jan. 15, 2004, previously incorporated by reference.

Typically gaming machines are provided with finite resources for storing the various types of game play data. Such resources often take the form of non-volatile RAM (NV-RAM), magnetic disk mass storage, etc.

Gaming regulators, such as the Nevada gaming commission, require that gaming machines save critical data for a certain length of time (e.g., a set number of games) before allowing older critical data to be purged from a gaming machine. To this end, gaming machine manufacturers sometimes store such data in battery-backed non-volatile RAM. This allows critical data to be stored without power for long periods of time. See the discussion in U.S. Pat. No. 6,804,763, previously incorporated by reference.

An ancillary issue arises with regard to preserving game data when a game is being removed from a gaming machine. Traditionally, a given gaming machine was born with and died with a single game, e.g., a video poker game. Modern technology allows games to be removed for various reasons such as because a license for the game has expired or because replacement with a different game is expected to increase revenue. A technology enabling such situations is downloadable code for individual games that can be executed on a given gaming machine or other terminal. In some terminals, only a single game is available for play at any given time. In other terminals, multiple games are available for user selection at particular instants in time.

Electronic downloading of the necessary software into the gaming machine allows a gaming machine to access scalable server farms and databases to select a set of games it needs from the game library. A desire of casino operators after games are safely downloaded is the ability to electronically move the games around on the casino floor. Casino managers routinely move slot machines (entire slot machine) around the floor in search of the optimum layout. A popular new game might be located near the door, but an older game might be better suited in the back. A Harley-Davidson game might be moved to the front during a Biker's convention, etc.

Currently, when a game is removed from a gaming machine, that "entire game," including the game image and all statistical, counter, and historical information is deleted together, at one time. The "game image" refers to executable code for playing a given game on a master gaming controller. There are various difficulties with this approach. First, because the history of a game must be preserved, some special effort is required to capture that history before the game is wiped clean from the terminal. In some cases, this is done manually by an attendant, who may review meters and other records as necessary at the time the game is removed. In addition or alternatively, casino personnel may instruct a server to capture recent accounting and/or game history information as necessary. Obviously, the operator intervention required for these efforts represents some burden for the casino or other gaming establishment.

On top of the efforts required to capture critical data and other relevant game play data, an operator may be required to reset all manner of ancillary conditions associated with the game before a new game can be installed on the terminal. For example, the operator may be required to re-seed a random number generator, reset various meters, set background colors associated with games, etc.

In view of the above, it would certainly be desirable to have an improved methodology for capturing relevant information at the time of game removal.

SUMMARY OF THE INVENTION

The invention described in the present specification meets the needs described above. It takes advantage of the fact that games may be divided into different portions having differing preservation needs. These different portions may be saved to set locations for set periods of time when a downloaded game that was once available on a given gaming terminal must be disabled, removed or otherwise made unavailable on the gaming terminal. The removal process may be automated or controlled remotely, although this is not strictly required. Further, the invention may be implemented using directories of the various game components for multiple downloaded games available to a single gaming terminal.

One aspect of the invention pertains to methods of preserving game data associated with a downloaded game after said downloaded game has been deactivated on a gaming terminal. Such methods may be characterized by the following sequence: (a) receiving instructions to deactivate the downloaded game; (b) rendering a non-modifiable component of the game unavailable for playing the downloaded game on the gaming terminal; and (c) preserving an accumulative component of the game on a memory device for a defined period of time after deactivating the downloaded game. In certain embodiments, the non-modifiable component of the game does not change over multiple game plays and comprises executable code for playing the downloaded game. In certain embodiments, the accumulative component of the game comprises data accumulated during plays of the downloaded game on the gaming terminal. Such data may comprise critical data generated during plays of the downloaded game. It may also comprise current game meters, accounting information, specific frames from the game play, game outcomes, numbers of games played, denominations played, and other information generated during plays of the downloaded game.

The instructions to deactivate may be provided in response to any of a number of different conditions or events such as (i) expiration of a license to the game; (ii) a decision by a gaming establishment to replace the downloaded game based market conditions (e.g., insufficient popularity to drive a progressive jackpot), (iii) discovery of a defect within the game, (iv) obsoleting the game in favor of newer versions (e.g., a progressive or Fort Knox variation of the game), and/or (v) a feature of the game is no longer supported (e.g., a particular bonus feature). The actual rendering the non-modifiable component unavailable for playing may comprise setting a flag in system software in the gaming terminal. Preferably, operations (b) and (c) occur automatically (e.g., without human intervention) after receiving instructions to deactivate the downloaded game.

In a normal operating state for the downloaded game—prior to rendering the non-modifiable component unavailable for playing—the non-modifiable component may be stored on a mass storage device associated with the gaming device and the accumulative component may be stored on non-volatile RAM associated with the gaming device. In certain embodiments, the memory device on which the accumulative component is preserved in (c) (after receiving instructions to deactivate) is also the non-volatile RAM device, associated with the gaming terminal.

In certain embodiments, the defined period of time during which the accumulative component is preserved in (c) comprises a number of games played on the gaming terminal after rendering a non-modifiable component of the game unavailable for playing said downloaded game. In other embodiments, other measures of time (either continuous time or a number of events associated with the gaming terminal or controlling gaming establishment) may be employed to define the period during which the accumulative component is preserved.

In certain embodiments, the accumulative component of the game is preserved on a device outside the gaming terminal. Such device may be, for example, a network server or a peer gaming terminal. The network server may be responsible for providing downloadable games to the gaming terminal.

In certain embodiments, a portion of the accumulative component is designated a "permanent data component," which is stored for a longer period of time than other portions the accumulative component are preserved on a memory device. The permanent data component may comprise, for example, one or more of (i) number of games played, (ii) win/loss ratio, (iii) average payback, and (iv) an indicator of the fact that a particular downloaded game was once available for play on the gaming terminal. The permanent data component may be compacted as part of the process.

Another aspect of the invention pertains to gaming devices, which may be characterized by the following features: (a) logic for separately maintaining an accumulative component of a game and a non modifiable component of the game; (b) a master gaming controller for executing game code for playing the game; and (c) logic deactivating the game on the gaming device. In certain embodiments, the logic for deactivating can render the non-modifiable component of the game unavailable for playing said game on the gaming system. In certain embodiments, the logic for deactivating can also preserve the accumulative component of the game on a memory device for a defined period of time after deactivating the downloaded game. The gaming device may also include a mass storage device for storing the non-modifiable component and/or a non-volatile RAM for storing the accumulative component.

Yet another aspect of the invention pertains to gaming system networks. Such networks may be characterized as including (a) a server for downloading games; and (b) at least one gaming terminal for playing downloaded games. The at least gaming terminal may comprise: (i) logic for separately maintaining an accumulative component of a game and a non-modifiable component of the game; and (ii) logic deactivating said game on the gaming device. As above, the logic for deactivating may (i) render the non-modifiable component of the game unavailable for playing said game on the gaming system, and/or (ii) preserve an accumulative component of the game on a memory device for a defined period of time after deactivating the downloaded game.

The gaming system network may also include one or more peer gaming terminals. In certain embodiments, it includes a server configured to control licenses to the downloaded games. In certain embodiments, it may include a server configured to send instructions for deactivating specific downloaded games to the at least one gaming terminal.

Also provided are computer program products including machine-readable media on which are stored program instructions for implementing at least some portion of the methods described above. Any of the methods described herein may be represented, in whole or in part, as program instructions that can be provided on such computer readable media. Also provided are various combinations of data and data structures generated and/or used as described herein.

These and other features and advantages of the invention will be described in more detail below with reference to associated drawings.

DETAILED DESCRIPTION OF THE PREFERRED EMBODIMENTS

Figure 2:
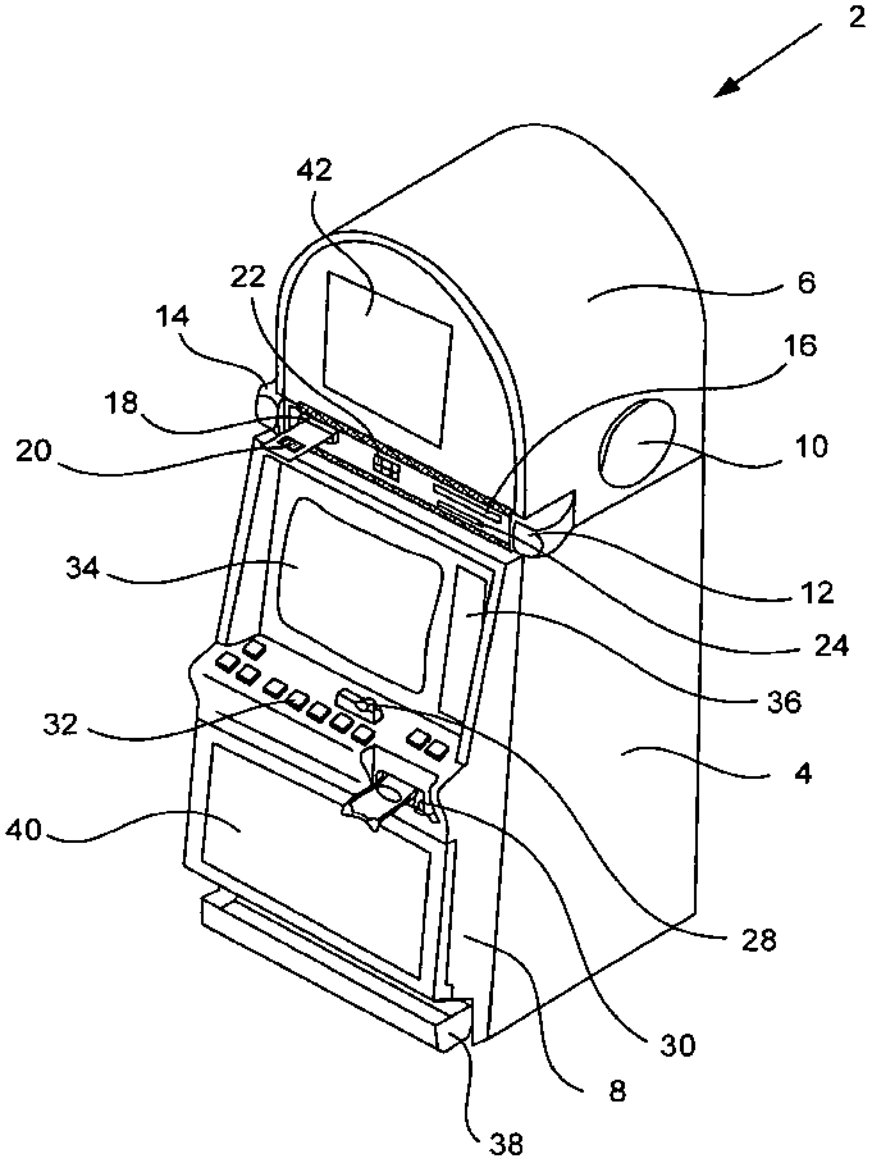
FIG. 2 is a perspective drawing of a gaming machine having a top box and other devices.

Overview As suggested, the present invention involves preserving a portion of a game containing specified game information, such as historical information, when a game is removed from a gaming terminal. In accordance with this invention, a game may be any game of chance such as slot games, video poker games, lottery games, and the like. A gaming terminal is generally any apparatus that supports playing a downloaded game. Examples include stand alone and networked gaming machines, personal computers, cell phones, personal digital assistants, and the like. FIG. 2, described below, depicts a gaming machine, which represents a specific embodiment of a gaming terminal for implementing the present invention. In order support downloading, a gaming terminal may be connected via a network to a source of games for downloading. Of course, this is not strictly required because, for example, games may be downloaded from portable memory devices that are temporarily resident on the gaming terminal.

In accordance with certain embodiments of the invention, a downloaded game has multiple portions or components, which have differing preservation requirements. When a downloaded game is to be removed from a gaming terminal, the various components are treated differently in terms of (1) whether or not they are preserved, (2) where they are stored, and (3) for how long they are stored. Thus, embodiments of the invention pertain to partial or staged removal of a downloaded game from a gaming terminal.

A typical game of chance contains logic and data for, among other things, processing player inputs, determining a game outcome, presenting a game display to the player (via typically video and audio output), and storing various pieces of information about the game. One way to visualize a game is as combination of non-modifiable portions and accumulative portions. The non-modifiable portions generally include, at least, executable code for implementing the game, which code processes user inputs, calculates game outcomes (using typically a random number generator), and presents the game to the user on the gaming terminal. The accumulative portions of a game are typically data and associated contextual information specifying such things as game history, game meter values, various types of accounting information, specific frames from the game play, game outcomes, numbers of games played, denominations played, and the like. In some cases, the accumulative portion comprises minimal state information required to re-create a game play using executing game code. In general, accumulative components are, as their name suggests, portions of the game that are accumulated and therefore saved at least temporarily.

In certain embodiments, the accumulative portions of the game may be divided into various subsets of data or derived components distinguished based on content. For example, one subset or derived component may be deemed particularly important for long-term storage and referred to as "permanent" data. Examples of permanent data include number of games played and the mere fact that a particular game was resident and/or played on a particular terminal at one time in the past, and the like. Examples of derived permanent data include, for example, win/loss ratios, average payback, and the like. Obviously, designating particular accumulative data as "permanent" is a choice made based upon the importance attached to that data by the particular gaming establishment or regulatory body having control or jurisdiction.

Some accumulative data may be designated as critical data or critical game information. The designation of some accumulative data as "critical" is dependent upon the requirements of controlling entities such as casinos and governmental bodies. In typical cases, critical data may comprise one or more of game history information, security information, accounting information, player tracking information, wide area progressive information and game state information. A few specific examples of critical information may include (1) Main door/Drop door/Cash door openings and closings, (2) Bill insert message with the denomination of the bill, (3) Hopper tilt, (4) Bill jam, (5) Reel tilt, (6) Coin in and Coin out tilts, (7) Power loss, (8) Card insert, (9) Card removal, (10) Jackpot, (11) Abandoned card (12) querying the non-volatile memory for the current credit available on the gaming machine, (13) reading the credit information from a player's card, (14) adding an amount of credits to the gaming machine, (15) writing to a player's card via the card reader and the device drivers to deduct the amount added to gaming machine from the card and (16) copying the new credit information to the non-volatile memory. Such information may be required to be kept by, for example, various gaming regulatory bodies (e.g., the Nevada Gaming Commission) for a period of time; e.g., 75 game plays after the information was accumulated.

The accumulative data to be saved may take the form of text, graphics, frames, video clips, etc. In the simplest case, it is merely textual data describing a game's state, history, statistics, etc. A more memory-intensive form of data storage stores frames (essentially bit maps of video still shots) for selected portions of the game presentation; e.g., frames associated with user inputs and presentation of game outcomes. Some of these frames may have embedded or associated data providing specific details such as state, statistics, etc. as described above. Frame capture for the purpose of preserving accumulative data is described in, for example, U.S. patent application Ser. No. 10/758,828 filed Jan. 15, 2004, previously incorporated by reference. Yet another way to save relevant game play information is via a game play sequence that re-presents the game as it appeared originally. This involves presentation of a series of frames and associated events, including, for example, user interactive events. It is effectively a movie or video clip of a game play. To implement this type of replay, it will be necessary to preserve essential state information about the game and then re-execute the game code using such state information.

In certain embodiments, the non modifiable component of a game is saved on a hard drive memory and temporarily loaded into main memory for execution. The accumulative data component (including the permanent data) is sometimes stored on a non-volatile RAM. See U.S. Pat. No. 6,804,763, previously incorporated by reference. In certain other embodiments, all components of a game may be stored together on NV-RAM, which takes the form of flash memory, MRAM, or other non-volatile storage media that can inexpensively store large quantities of data.

To trigger a change in storage location or state of a particular game component (accumulative and/or un-modifiable), a downloaded game (or games) that was once available on gaming terminal may be made unavailable for future play. As indicated, a game may be deactivated for various reasons such as expiration of a license to the game, poor revenue generation, etc. A game may be deactivated by one or more of the following techniques: (1) deleting at least a portion of the game from all memory on the gaming terminal, (2) moving at least a portion of the game to a different memory device within the terminal or outside the terminal, and (3) rendering the game inactive without moving it from the gaming terminal memory device on which it was once stored. In situation (3), a software mechanism may be control player access to the game, e.g., a flag may be set indicating that the game cannot be presented to a user. Otherwise, the game components may be maintained, as they were, stored on the gaming terminal when the game was available for play.

Depending on the needs of the gaming establishment or the design of a gaming terminal, memory for storing game components after deactivation may be found in any one or more of (1) a local gaming terminal where a downloaded game is played, (2) a peer machine of the terminal, and/or (3) a server networked with the gaming terminal. Any one of these machines may include dedicated NV-RAM, main memory volatile RAM, hard drives, etc. They may also include temporarily attached portable memory such as optical disks, semiconductor memory devices, etc. As indicate, the various game components may be independently and separately stored on any of these devices.

Depending on which forms of accumulative data are employed, a storage procedure for preserving game data after deactivation may dictate different types of and locations of storage media. For example, simple textual data, particularly compacted textual data, may be conveniently stored in NV-RAM, while frames might be more conveniently stored on a mass storage device associated with a server or other network component separate from the gaming terminal where the game play of interest took place.

The accumulative component of a game is optionally compacted or compressed when the game is deactivated or removed from a gaming terminal. Compaction may be performed either on the gaming terminal itself or at some other location, where the accumulative component resides for a period of time. Data compaction and compression techniques are well known to those of skill in the art. Generally, data compaction involves a reduction of the number of data elements, bandwidth, cost, and time for the generation, transmission, and storage of data without loss of information by eliminating unnecessary redundancy, removing irrelevancy, or using special coding. Examples of data compaction methods are the use of fixed-tolerance bands, variable-tolerance bands, slope-keypoints, sample changes, curve patterns, curve fitting, variable-precision coding, frequency analysis, and probability analysis.

In accordance with certain embodiments of the present invention, various components of a game may be stored for various lengths of time after deactivation as specified by, for example, a casino policy. The lengths of storage time specified for particular components may be set according to the needs of a gaming establishment, one of which comprises requirements of regulatory bodies. The lengths of time may be measured in terms of a number of relevant events or in terms continuous time (minutes, days, weeks, months, years, etc.). Examples of event-based storage times include terminal specific actions such number of games played on a terminal, number of different players using player tracking cards on the terminal, number of separate payouts, total value of payouts, number of bonus events realized, etc.

Assume now that after a downloaded game has been deactivated, a user, regulator, and/or gaming establishment needs to review the accumulated data associated with game play of the downloaded game. Such review may involve, in the simplest case, presentation of the relevant data (e.g., critical data or other game history data) in textual form. Alternatively, the review may comprise re-creating the presentation of the game to the player by executing game code (un-modifiable component) using game state data stored after the game was removed. In other situations where particular frames or video clips were maintained as accumulated data after the game was deactivated or removed, the review may simply involve viewing individual frames or video from the stored data.

Any of the above types of review can be performed at any location that has been established (or merely chosen as convenient) by the gaming establishment or regulator. For example, the review may take place at the gaming terminal where the game was played. Alternatively, it may take place at a peer terminal or network server on a gaming network. Some relevant methods and devices involving peer-to-peer file transfers between gaming machines are discussed in U.S. patent application Ser. No. 11/173,442 by Kinsley et al., filed Jul. 1, 2005 and entitled "METHODS AND DEVICES FOR DOWNLOADING GAMES OF CHANCE," which is hereby incorporated by reference in its entirety and for all purposes.

Example Sequences

At this point, certain embodiments of the invention will be illustrated by way of specific event sequences.

A. Disable but Temporarily Preserve Entire Game on a Terminal

Embodiment 1

(a) Receive request to remove game from gaming terminal (b) Disable game from being played by, for example, setting a flag in an associated portion of a directory stored on NV-RAM or elsewhere. The flag specifies that the game is unavailable for play and prevents the terminal's system software from executing the non-modifiable game code. Note that when the game is disabled, it may be temporarily maintained on the machine, it is just not playable. In other words, the game code remains resident, but not executable, on the gaming terminal.

In this embodiment as well as many others presented herein, the game logic is kept primarily to be able to visually redisplay the game in context to the data being preserved (e.g., to recall and present a game history when necessary). As indicated, one reason for keeping history records is for conflict resolution with patrons. Consider that some patrons may drink to excess while gambling such that their recollection and skill are impaired. The ability to show previous games as they were visually represented to the player is of great value. One should ensure that the last "X" number of games can be recalled quickly to resolve player disputes. Once a reasonable number of games or other duration has been exceeded, the disabled game and the associated data (history) can be purged from the machine.

(c) Maintain at least the accumulative data for game in NV-RAM (or other defined storage location) as is, without modification from the states it achieved when the game was enabled on the terminal.

(d) After sufficient time has elapsed such that no further accumulative data (e.g., game history) may be required, remove entire game including all non-modifiable and accumulative data. In a typical example involving game history, such data may be maintained for 75 game plays after "disabling" the game on the terminal.

Embodiment 2

This embodiment is the same as that described in first embodiment except that at operation (d), "permanent" data is saved on the NV-RAM without modification for an extended period (after the remaining accumulative data has been removed) such as a defined number of days, weeks, months, years, or number or game plays. In some instances, the information may reside on the terminal for the life of the terminal.

Embodiment 3

This embodiment involves the same set of operations as specified in embodiment 2, but includes an additional operation of compacting the permanent data before it is saved.

Embodiment 4

This embodiment is identical to embodiment 3 but involves compacting all accumulative data (not just data designated as "permanent data") and therefore storing it on the NV-RAM (or other defined storage location on the terminal) after the non-modifiable component of the game has been removed at operation (d).

Embodiment 5

This embodiment is identical to embodiment 4 except that the compacted accumulative data is stored at a location off of the gaming terminal. Such location may be a server or a peer terminal on the network. The accumulative data may be stored on the remote location for a relatively long period of time, possibly indefinitely. Regardless of how long the compacted data is stored off terminal, the basic accumulative data may be removed from the gaming terminal with the remainder of the game in operation (d) as mentioned above.

Embodiment 6

This embodiment is the same as embodiment 2 or 3, but involves sending just the permanent data (compacted or not) to a server or other location on the network. In some cases, the permanent data would then be deleted from the local terminal where the game to be removed had resided.

Embodiment 7

This embodiment is the same as embodiments 2 or 6, but all accumulative data (compacted or not) is sent to a network server or other remote location (rather than a local NV-RAM) in operation (c) and maintained there until the period of time identified in (d) elapses. Thereafter, it may be deleted from the server or other remote location. This embodiment is perhaps desirable in a case where the accumulative data comprises frames or other large blocks of data to be stored. It represents a modification of operations (c) and (d) described in the first embodiment.

B. Embodiments in which the Game is Replayed on the Gaming Terminal

Embodiment 1

(a) Receive request to remove game from a gaming terminal.

(b) Remove all portions of the game, except minimal state information required to recreate a game play using executable game code. Such minimal state information may be viewed as a form of permanent or accumulative data. In some embodiments, such information will be maintained on the game play terminal in, for example, NV-RAM. Because such data does not require significant memory in many cases, it need not be compacted.

(c) Determine that an operator or player needs to review one or more game plays.

(d) Download or otherwise reinstall the game non-modifiable portions to the gaming terminal. (e) At the gaming terminal, re-create the required historical game plays by executing the game using preserved state information for the required game plays.

Embodiment 2

This embodiment is the same as embodiment 1 except that the state information is deleted after a predefined period has elapsed.

Embodiment 3

This embodiment is the same as embodiment 1 except that the state information is compacted in operation (b).

In the above embodiments, in operation (d), the game may be reinstalled from a server, a portable memory device (e.g., a CD ROM, or flash memory device) or transferred from a peer machine such as another terminal where the game is currently installed. Note also that some of the embodiments in this example may be simple extensions of the embodiments in A, with further game re-creation events.

C. Re-Create Game Play at a Peer Terminal, Server, or other Remote Location

Embodiment 1

(a) Receive request to remove game from terminal.

(b) Provide game information such as frames to a server or other remote storage location (including, for example, portable storage, peer machines, etc.)

(c) Delete game in its entirety from the gaming terminal.

(d) Determine that an operator or player needs to review a particular game play.

(e) Using the game state information (now stored off the terminal) together with executable code for the game, re-create the required historical game play by executing the game using the preserved historical state information at a location other than the terminal. As an example, the re-creation of the game play may take place at a server or other gaming terminal. The location of the re-creation need not be the same location where the game information was stored in (b).

Embodiment 2

This embodiment is the same as embodiment 1 except that the remotely stored game information is deleted after a predetermined period has elapsed, which will occur after recreation of the game in this example.

Embodiment 3

This embodiment is the same as either embodiment 1 or embodiment 2, but involves the additional operation of compacting the state information before storing it remotely.

Embodiment 4

This embodiment is the same as embodiment 1 except that it involves saving "permanent" data on the original gaming terminal. Hence, this embodiment involves a modified version of operation (c) in embodiment 1.

D Provide Only Textual Data

Embodiment 1

(a) Receive request to remove a game from a gaming terminal.

(b) Remove all portions of the game except for textual accumulative data.

(c) Determine that an operator or player needs to review information about a previous game play. (d) Display textual information relevant to game play in question.

Embodiment 2

This embodiment is identical to embodiment 1 except that only a subset of the accumulative textual data is preserved. That subset is deemed to be the "permanent" data and may include, for example, meter information and critical data about the game plays.

Embodiment 3

This embodiment is identical to either of embodiments 1 and 2 but has an additional step (e) that involves deleting the preserved accumulative or permanent data after a defined period of time has elapsed (e.g., 75 game plays after the main portion of the game has been removed), which occurs after displaying the textual information.

Figure 1A:
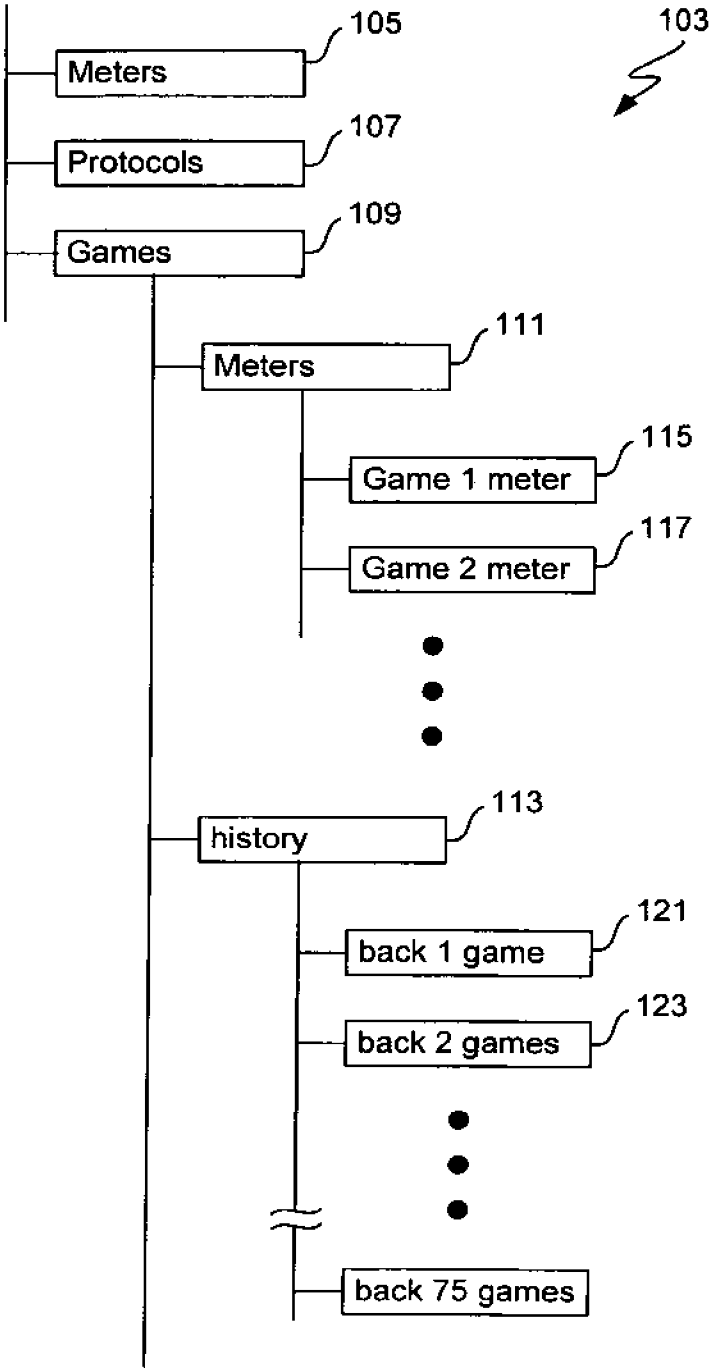
FIG. 1A presents a directory structure for a NV-RAM or other memory device that stores accumulative data associated with specific games on a gaming terminal.

E. Sample Directory Structure (a) FIG. 1A presents a sample directory structure 103 for NV-RAM on a gaming terminal at a time when multiple games are available for play on a gaming terminal. The directory includes system wide folders or sections such as meters 105 (e.g., coin in and coin out values for the terminal) and protocols 107 (e.g., handling cabinet door open events). The directory also includes a game specific folder or section 109. In this specific example, subsections or folders are provided for game meters 111 and game histories 113 are provided under the general game folder 109. Under meters folder 111 there is separate section or folder 115 for meters associated with a Game 1 (e.g., "Little Green Men") and another section 117 for meters associated with a Game 1 (e.g., a video poker game). Other sub-folders may be provided under game meters folder 111 if other games are available on the gaming terminal. The game histories folder 113 resides at the same level as the game meters folder 111 in the directory hierarchy. Within histories folder 113, there exists folders for accumulative game events that must be stored for a specified length of time. Whenever a game is played, new folders are created under game history folder 113. Each new folder has an associated time or sequential number. For example, in the directory 103 shown, a "back 1 game" folder 121 holds the events for the most recent game played (Little Green Men) on the terminal. The second most recent game (poker in this instance) has its own accumulative event folder 123. A number of other accumulative game folders would be in existence but are not shown in this figure.

Figure 1B:
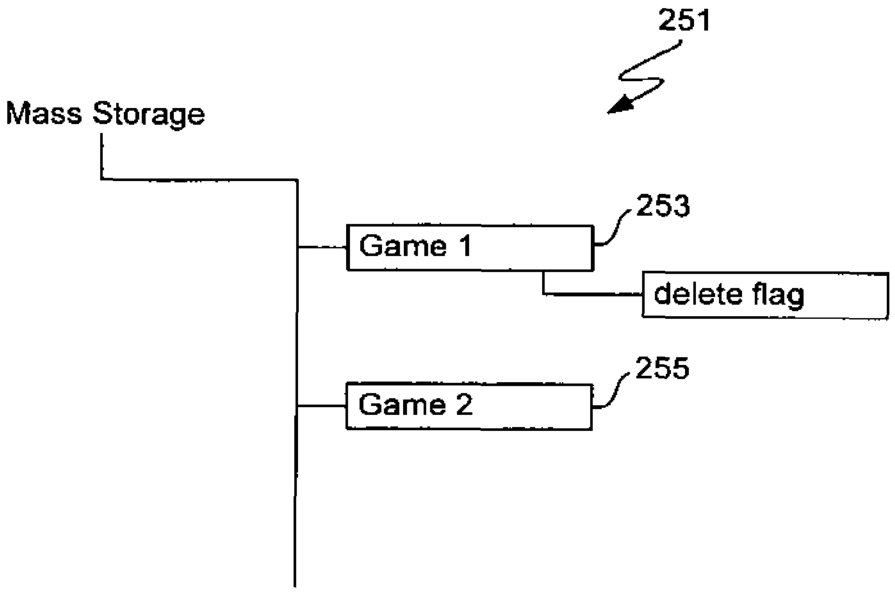
FIG. 1B presents a directory structure for a hard drive or other memory device that stores executable game code and possibly other non-modifiable data associated with specific games on a gaming terminal.

In FIG. 1B, a portion of a directory structure 151 for a hard drive on the gaming terminal is shown. In this example, non-modifiable components for the various games available on the terminal are provided. The directory provides a folder 153 for a first game (e.g., Little Green Men) and a parallel folder 155 for a second game (e.g., a video poker game). Each folder includes the executable code for the particular game in question along with, optionally, other features or resources that may be required to provide the complete game play presentation and outcome calculation.

(b) After the gaming terminal receives instructions to deactivate a game, e.g., the Little Green Men game, the terminal may remove or otherwise deactivate the un-modifiable component of the game. This may be accomplished by immediately setting a flag in the appropriate position of directory 151 or actively wiping the portion of memory where the game code is stored.

The accumulative component of the game is handled in a manner that preserves it on the terminal's NV-RAM for a required period of time. For example, when a certain number of subsequent events occur after creation of an event folder, that event folder and its contents are deleted from the directory—and ultimately overwritten in NV-RAM. In the of FIG. 1A, the Back Game 1 game history folder 115 is deleted after a specified number of games have been played after it was created—e.g., 75 games. In this manner, when a game is deactivated on the gaming terminal, the non-modifiable game code immediately becomes unavailable for re-execution and no more game history folders will be generated for that folder. But other games may be played on the terminal. After each of these is played, a new game history folder is created under folder 113 in the directory 103. With each new game play, the remaining history folders for the deleted game are also incremented. Eventually, they are removed from the directory and become inaccessible. Nevertheless, they are available for some period of time after the basic game is to be deactivated from the terminal. This directory scheme is tailored to meet the needs of the gaming establishment as well as any regulatory body having jurisdiction.

Embodiment of Gaming Terminal and Download Network

Turning first to FIG. 2, a video gaming machine 2 suitable for use as a gaming terminal of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other appropriate electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games may be provided with gaming terminals of this invention. Examples include mechanical slot games, video slot games, video poker, video black jack, video pachinko and lottery. Further, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game play from any one of a plurality of instances available on the gaming machine. For example, the gaming machine may provide a menu with a list of the instances of games that are available for play on the gaming machine and a player may be able to select from the list a first instance of a game of chance that they wish to play.

Code for executing the various instances of games available for play on the gaming machine 2 may be stored as game software on a mass storage device (e.g., a magnetic hard disk drive) in the gaming machine or may be generated on a remote gaming device but then displayed on the gaming machine. The gaming machine 2 may execute game software (e.g., a non-modifiable component as described above) from various sources including software from a mass storage device on the gaming terminal, software provided over a network from a remote storage device, or video streaming software that allows the game to be displayed on the gaming machine. When a game instance is stored on the gaming machine 2, the non-modifiable component(s) may be loaded from the mass storage device into main memory (e.g., RAM) for execution. In some cases, after a selection of a game for play, the executable game software that allows the selected game to be generated is downloaded from a remote gaming device, such as another gaming machine or a game server.

In accordance with this invention, logic such as code is provided for separately maintaining accumulative and non-modifiable components of a game. Such logic typically, though not necessarily resides locally on the gaming terminal such as gaming machine 2, particularly on a mass storage device or possibly on NV-RAM. However, if the gaming device is terminal that takes detailed directions from another node such as a server, the relevant logic may reside on any one of various other nodes such as a server or peer node. In certain embodiments, the logic for separately maintaining the game components may control gaming system resources and/or maintain directories of components for games such as the directories depicted in FIGS. 1A and 1B.

Certain embodiments of the invention also provide logic for processing instructions to deactivate games on a gaming terminal such machine 2. Such logic is intended to (i) render the non modifiable component of the game unavailable for playing on the gaming system, and (ii) preserve an accumulative component of the game on a memory device. Such logic may be configured to preserve the accumulative component for a defined period of time after deactivating the downloaded game. Again, the logic for performing these functions can be provided locally on a gaming terminal such as gaming machine 2 or remotely on a network device in communication with the terminal. Further, the logic for performing functions (i) and (ii) may be decoupled so that one piece of logic resides in one memory location and the other resides elsewhere, possibly on a different machine.

When referring to "logic," it is generally intended to represent any form of processing logic, typically algorithmic tasks implemented in response to executing instructions or code. Such logic may be provided as software, firmware or even hard-coded logic in hardware.

Returning to FIG. 2, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the figure. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are typically controlled and powered, in part, by circuitry (e.g. a master gaming controller) housed within the main cabinet 4 of the machine 2. Further, the bonus games, progressive games, and other ancillary games may contain non-modifiable and accumulative components as described above. These may be stored separately with the corresponding components of the primary game or they may be stored independently.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described herein, can be deployed on most any gaming machine now available or hereafter developed.

Some gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers.

At first glance, one might believe that adapting PC technologies to the gaming industry would be a simple proposition because both PCs and gaming machines and other gaming terminals employ microprocessors that control a variety of devices. However, because of such reasons as (1) the regulatory requirements that are placed upon gaming machines, (2) the harsh environment in which gaming machines operate, (3) security requirements and (4) fault tolerance requirements, adapting PC technologies to a gaming machine presents numerous engineering obstacles. Further, techniques and methods for solving a problem in the PC industry, such as device compatibility and connectivity issues, might not be adequate or appropriate in the gaming environment. For instance, a fault or a weakness tolerated in a PC, such as security holes in software or frequent crashes, may not be tolerable in a gaming terminal.

In certain embodiments, gaming terminals are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated.

Typically, a gaming machine will have safeguards that prevent an operator or player of a gaming machine from manipulating hardware and software in a manner that gives them an unfair and some cases an illegal advantage. The gaming machine may have a means to determine if the code, including code for separately treating non-modifiable and accumulative game components, it will execute is valid. If the code is not valid, the gaming machine can prevent the code from being executed.

A typical method of operation for game software employs a state machine. Different functions of the game (bet, play, result, points in the graphical presentation, etc.) may be defined as separate states. When a game moves from one state to another, critical data regarding the game software may be stored in a non-volatile memory subsystem. As explained, this ensures the player's wager and credits are preserved and it minimizes potential disputes in the event of a malfunction on the gaming machine. Such critical data is preserved when a downloaded game is removed or deactivated in a particular gaming terminal.

In general, the gaming machine does not advance from a first state to a second state until critical information (and sometimes other portions of the accumulative component) that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. As explained, battery backed RAM devices are sometimes used to preserve this critical data during, at least, the time when a game is available on a terminal, although other types of non-volatile memory devices may be employed.

As described in the preceding paragraph, when a malfunction occurs during a game of chance, the gaming machine may be restored to a state in the game of chance just prior to when the malfunction occurred. The restored state may include accumulative information such as metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the point just prior to the malfunction including an indication of selections that have already been made by the player. In general, the gaming machine may be restored to any state in a plurality of states that occur in the game of chance that occurs while the game of chance is played or to states that occur between the play of a game of chance.

As explained above, other portions of the accumulative component of a game may also be stored in a non-volatile memory device. One important example is the game history information for previous games played such as an amount wagered, the outcome of the game and so forth. As indicated above, this accumulative information may be detailed enough to reconstruct a portion of the graphical presentation that was previously presented on the gaming machine and the state of the gaming machine (e.g., credits) at the time the game of chance was played.

Trusted memory devices are included in certain gaming terminals and/or servers to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, certain gaming computers of this invention that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 2, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Certain game preferences of the player playing the game may be read from a card inserted into the card reader. Before playing, the player may also chose a particular game to play from a game selection menu may be provided on a video display, which offers a choice of at least two electronic games. Typically, the choices of games available to the player are only those licensed and downloaded for play on the gaming platform. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions, which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In certain embodiments, the present invention pertains to gaming systems or networks comprising multiple nodes. Typically, at least one of the nodes is a game terminal such as the gaming machine just described. Another node, a server node, controls availability of game instances on various game terminals. It may provide downloaded games to the individual game terminals. It may also, in some embodiments, provide the instructions to remove games from specific game terminals. Further, a server node or peer terminal on the network may provide memory for storing accumulative components after a terminal must deactivate a game. In the following example of a gaming system or network (presented in FIG. 3), various servers are identified. Each of these has the ability to store accumulative components of a game as needed for embodiments of the invention in which accumulative components are stored remotely from the game terminal in which they were generated. Each may store the entire accumulative component of a game or some portion thereof such as permanent data.

Figure 3:
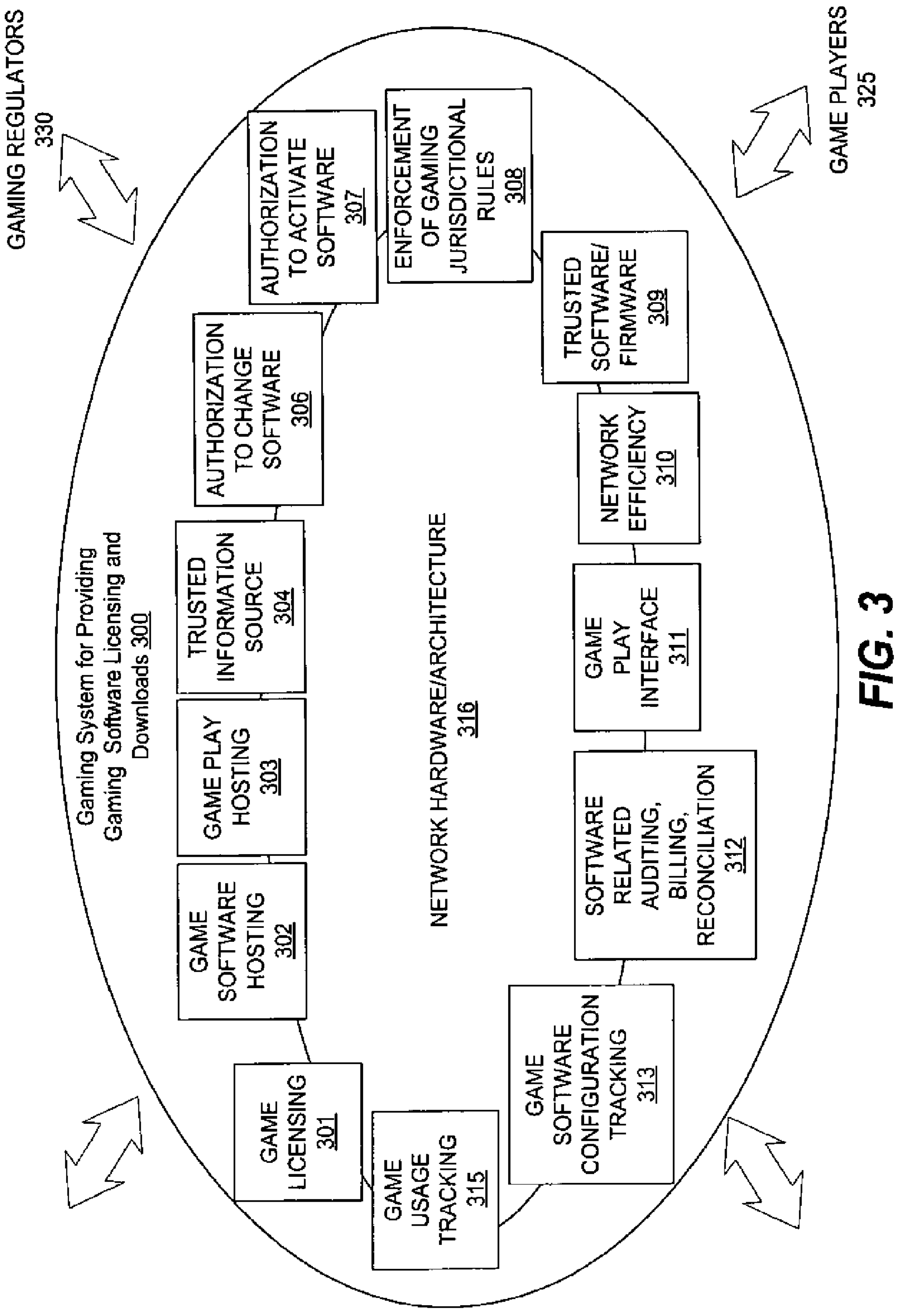
FIG. 3 is a block diagram of a gaming system suitable for use with the present invention.

In FIG. 3, the components of a gaming system 300 for providing game software licensing and downloads are described functionally. The described functions may be instantiated in hardware, firmware and/or software and executed on a suitable device. In the system 300, there may be many instances of the same function, such as multiple game play interfaces 311. However, for the sake of simplicity in FIG. 3, only one instance of each function is shown. The functions of the components may be combined. For example, a single device may comprise the game play interface 311 and include trusted software and firmware 309.

The gaming system 300 may receive inputs from different groups/entities and output various services and or information to these groups/entities. For example, game players 325 primarily input cash or indicia of credit into the system, make game selections that trigger software downloads, and receive entertainment in exchange for their inputs. Game software content providers 335 provide game software for the system and may receive compensation for the content they provide based on licensing agreements with the gaming machine operators. Gaming machine operators select game software for distribution, distribute the game software on the gaming devices in the system 300, receive revenue for the use of their software and compensate the gaming machine operators. The gaming regulators 330 may provide rules and regulations that must be applied to the gaming system and may receive reports and other information confirming that rules are being obeyed.

In the following paragraphs, details of each component and some of the interactions between the components are described with respect to FIG. 3. The game software license host 301 may be a server connected to a number of remote gaming devices that provides licensing services to the remote gaming devices. In certain embodiments, the license host 301 may (1) receive token requests for tokens used to activate software executed on the remote gaming devices, (2) send tokens to the remote gaming devices, (3) track token usage, (4) grant and/or renew software licenses for software executed on the remote gaming devices, and (5) initiate and/or control removal of games from the gaming devices. The token usage may be used in utility based licensing schemes, such as a pay-per-use scheme.

In another embodiment, a game usage-tracking host 315 may track the usage of game software on a plurality of devices in communication with the host. The game usage-tracking host 315 may be in communication with a plurality of game play hosts and gaming machines. From the game play hosts and gaming machines, the game usage tracking host 315 may receive updates of an amount that each game available for play on the devices has been played and on amount that has been wagered per game. This information may be stored in a database and used for billing according to methods described in a utility based licensing agreement. Additional accumulative data may be provided to the usage-tracking host at the times when games are removed from particular gaming terminals.

The game software host 302 may provide game software downloads, such as downloads of game software or game firmware, to various devious in the game system 300. For example, when the software to generate the game is not available on the game play interface 311, the game software host 302 may download software to generate a selected game of chance played on the game play interface. Further, the game software host 302 may download new game content to a plurality of gaming machines via a request from a gaming machine operator.

In one embodiment, the game software host 302 may also be a game software configuration-tracking host 313. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, “Gaming Terminal Data Repository and Information System,” filed Dec. 21, 2000, which is incorporated herein in its entirety and for all purposes.

A game play host device 303 may be a host server connected to a plurality of remote clients that generates games of chance that are displayed on a plurality of remote game play interfaces 311. For example, the game play host device 303 may be a server that provides central determination for a bingo game play played on a plurality of connected game play interfaces 311. As another example, the game play host device 303 may generate games of chance, such as slot games or video card games, for display on a remote client. A game player using the remote client may be able to select from a number of games that are provided on the client by the host device 303. The game play host device 303 may receive game software management services, such as receiving downloads of new game software, from the game software host 302 and may receive game software licensing services, such as the granting or renewing of software licenses for software executed on the device 303, from the game license host 301.

In particular embodiments, the game play interfaces or other gaming terminals in the gaming system 300 may be portable devices, such as electronic tokens, cell phones, smart cards, tablet PC’s and PDA’s. The portable devices may support wireless communications and thus, may be referred to as wireless mobile devices. The network hardware architecture 316 may be enabled to support communications between wireless mobile devices and other gaming devices in gaming system. In one embodiment, the wireless mobile devices may be used to play games of chance.

The gaming system 300 may use a number of trusted information sources for various purposes including storage of accumulative components of games that have been deactivated on certain gaming devices. Trusted information sources 304 may be devices, such as servers, that provide information used to authenticate/activate other pieces of information. CRC values used to authenticate software, license tokens used to allow the use of software or product activation codes used to activate to software are examples of trusted information that might be provided from a trusted information source 304. Trusted information sources may be a memory device, such as an EPROM, that includes trusted information used to authenticate other information. For example, a game play interface 311 may store a private encryption key in a trusted memory device that is used in a private key-public key encryption scheme to authenticate information from another gaming device.

When a trusted information source 304 is in communication with a remote device via a network, the remote device will employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 300 of the present invention may include devices 306 that provide authorization to download software from a first device to a second device and devices 307 that provide activation codes or information that allow downloaded software to be activated. The devices 306 and 307 may be remote servers and may also be trusted information sources. One example of a method of providing product activation codes that may be used with the present invention is describes in previously incorporated U.S. Pat. No. 6,264, 561.

A device 306 that monitors a plurality of gaming devices to determine adherence of the devices to gaming jurisdictional rules 308 may be included in the system 300. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 300 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 316 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 310 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 312. For example, a software licensing billing server may generate a bill for a gaming device operator based upon a usage of games over a time period on the gaming devices owned by the operator. In another example, a software auditing server may provide reports on game software downloads to various gaming devices in the gaming system 300 and current configurations of the game software on these gaming devices.

At particular time intervals, the software auditing server 312 may also request software configurations from a number of gaming devices in the gaming system. The server may then reconcile the software configuration on each gaming device. In one embodiment, the software auditing server 312 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 3. Many of the interactions are coupled. For example, methods used for game licensing may affect methods used for game downloading and vice versa. For the purposes of explanation, details of a few possible interactions between the components of the system 300 relating to software licensing and software downloads have been described. The descriptions are selected to illustrate particular interactions in the game system 300. These descriptions are provided for the purposes of explanation only and are not intended to limit the scope of the present invention.

It will be understood that the above-described arrangements of apparatus and methods are merely illustrative of applications of the principles of this invention and many other embodiments and modifications may be made without departing from the spirit and scope of the invention as defined in the claims. Features of the invention described herein may be provided alone or in any combination.

What is claimed is:

1. A method of replaying a prior game play cycle of a game on a gaming terminal, wherein the game has been deactivated from the gaming terminal, the method comprising:

deactivating, with a remote server, the game previously downloaded onto the gaming terminal, said game comprising a game logic component and an accumulative data component, the accumulative data component including minimal state information required to recreate a prior game play cycle of the game on the gaming terminal, wherein, after receiving instructions to deactivate the game, automatically, without altering the game logic component:

removing the game logic component from the gaming terminal such that the game can no longer be played on the gaming terminal, and preserving the accumulative data component of the game on a memory device for a defined period of time after deactivating the game, wherein the accumulative data component of the game comprises data accumulated during plays of the game on the gaming terminal;

receiving an indication that the prior game play cycle is to be recreated;

downloading the game logic component to the gaming terminal; and recreating the prior game play cycle on the gaming terminal with the game logic component and the accumulative data component.

2. The method of claim 1, wherein the accumulative data component comprises critical data generated during plays of the downloaded game.

3. The method of claim 1, wherein the accumulative data component comprises one or more of current game meters, accounting information, specific frames from the game play, game outcomes, numbers of games played, and denominations played.

4. The method of claim 1, further comprising reinstalling the game logic component after downloading the game logic component.

5. The method of claim 1, wherein the accumulative data component is stored on a non-volatile RAM device prior to deactivating the game.

6. The method of claim 5, wherein the memory device on which the accumulative data component is preserved in is also said non-volatile RAM device.

7. The method of claim 6, wherein the memory device is on the gaming terminal.

8. The method of claim 1, further comprising deleting the accumulative data component after a defined period of time has elapsed.

9. The method of claim 8, wherein the defined period of time comprises a number of games played on the gaming terminal after removing the game logic component from the gaming terminal.

10. The method of claim 1, wherein preserving an accumulative data component comprises preserving the accumulative data component on a device outside the gaming terminal.

11. The method of claim 10, wherein the device outside the gaming terminal is a network server or a peer gaming terminal.

12. The method of claim 1, wherein the game logic component is downloaded from a server, a portable memory device, or another gaming terminal.

13. A non-transitory computer readable media with computer-executable instructions embodied thereon that, when executed by a processor of a gaming terminal, cause the gaming terminal to perform a method of replaying a prior game play cycle of a game on the gaming terminal, wherein the game has been deactivated from the gaming terminal, the media including:

instructions for deactivating, with a remote server, the game previously downloaded onto the gaming terminal, said game comprising a game logic component and an accumulative data component, the accumulative data component including minimal state information required to recreate a prior game play cycle of the game on the gaming terminal, wherein, after receiving instructions to deactivate the game, automatically, without altering the game logic component:

removing the game logic component from the gaming terminal such that the game can no longer be played on the gaming terminal, and preserving the accumulative data component of the game on a memory device for a defined period of time after deactivating the game, wherein the accumulative data component of the game comprises data accumulated during plays of the game on the gaming terminal;

instructions for receiving an indication that the prior game play cycle is to be recreated;

instructions for downloading the game logic component to the gaming terminal; and instructions for recreating the prior game play cycle on the gaming terminal with the game logic component and the accumulative data component.

14. The media of claim 13, wherein the accumulative data component comprises critical data generated during plays of the downloaded game.

15. The media of claim 14, wherein the accumulative data component comprises one or more of current game meters, accounting information, specific frames from the game play, game outcomes, numbers of games played, and denominations played.

16. The media of claim 13, further comprising instructions for reinstalling the game logic component after downloading the game logic component.

17. The media of claim 13, further comprising instructions for deleting the accumulative data component after a defined period of time has elapsed.

18. The media of claim 17, wherein the defined period of time comprises a number of games played on the gaming terminal after removing the game logic component from the gaming terminal.

19. A gaming device comprising:

logic for separately maintaining game logic and an accumulative data component of a game, said game having been previously downloaded onto the gaming device, wherein the accumulative data component includes minimal state information required to recreate a prior game play cycle of the game on the gaming device, and wherein the game logic of the game comprises executable code for playing the game;

a master gaming controller for executing game code for playing the game; and logic for automatically deactivating the game in response to receiving instructions to deactivate the game without altering the game logic, wherein the deactivation includes:

removing the game logic component from the gaming device such that the game can no longer be played on the gaming device, and preserving the accumulative data component of the game on a memory device for a defined period of time after deactivating the game, wherein the accumulative data component of the game comprises data accumulated during plays of the game on the gaming device; and logic for recreating the prior game play cycle on the gaming device in response to receiving an indication that the prior game play cycle is to be recreated, wherein the recreation of the game play cycle includes:

downloading the game logic component to the gaming terminal, and recreating the prior game play cycle on the gaming terminal with the game logic component and the accumulative data component.

20. The gaming device of claim 19, wherein the accumulative data component comprises critical data generated during plays of the downloaded game.

21. The gaming device of claim 19, wherein the accumulative data component comprises one or more of current game meters, accounting information, specific frames from the game play, game outcomes, numbers of games played, and denominations played.

22. The gaming device of claim 19, wherein the recreation of the game play cycle further comprises reinstalling the game logic component after downloading the game logic component.

23. The gaming device of claim 19, wherein the accumulative data component is stored on a non-volatile RAM device of the gaming device prior to deactivating the game.

24. The gaming device of claim 19, wherein preserving an accumulative data component comprises preserving the accumulative data component on a device outside the gaming terminal.

25. The gaming device of claim 24, wherein the device outside the gaming terminal is a network server or a peer gaming terminal.

* * * * *